(12) United States Patent
Kim

(10) Patent No.: US 12,454,078 B2
(45) Date of Patent: Oct. 28, 2025

(54) SUPER ABSORBENT POLYMER DRYING APPARATUS

(71) Applicant: LG Chem, Ltd., Seoul (KR)

(72) Inventor: Mookon Kim, Daejeon (KR)

(73) Assignee: LG Chem, Ltd., Seoul (KR)

(*) Notice: Subject to any disclaimer, the term of this patent is extended or adjusted under 35 U.S.C. 154(b) by 813 days.

(21) Appl. No.: 17/776,123

(22) PCT Filed: Aug. 4, 2021

(86) PCT No.: PCT/KR2021/010292
§ 371 (c)(1),
(2) Date: May 11, 2022

(87) PCT Pub. No.: WO2022/285906
PCT Pub. Date: Apr. 28, 2022

(65) Prior Publication Data
US 2022/0379524 A1 Dec. 1, 2022

(30) Foreign Application Priority Data
Oct. 23, 2020 (KR) .......... 10-2020-0138510

(51) Int. Cl.
*B29B 13/06* (2006.01)
(52) U.S. Cl.
CPC ...... *B29B 13/06* (2013.01); *B29K 2995/0068* (2013.01)
(58) Field of Classification Search
CPC ............ B29B 13/06; B29K 2995/0068; B29C 2035/0283; B29C 2035/046;
(Continued)

(56) References Cited

U.S. PATENT DOCUMENTS 3,566,944 A * 3/1971 Tilby .................. C13B 5/00
198/624
3,875,677 A * 4/1975 McWhirter ............. F26B 15/18
34/208
(Continued)

FOREIGN PATENT DOCUMENTS

CN 104640686 A 5/2015
CN 105980799 A 9/2016
(Continued)

OTHER PUBLICATIONS

International Search Report for Application No. PCT/KR2021/010292 mailed Nov. 23, 2021, pp. 1-4.
(Continued)

*Primary Examiner* — John P McCormack
(74) *Attorney, Agent, or Firm* — Lerner David LLP

(57) ABSTRACT

A super absorbent polymer drying apparatus is disclosed. The super absorbent polymer drying apparatus is a drying apparatus equipped with a conveyor for drying the super absorbent polymer, and may include: a conveyor for transferring the super absorbent polymer; and a hot air supply part for supplying dry hot air to the conveyor, wherein the conveyor may include a plurality of conveyor beds connected to each other in a bent state, a link connecting part for connecting between the plurality of conveyor beds, and a driving part for driving the conveyor beds.

6 Claims, 2 Drawing Sheets

(58) Field of Classification Search
CPC ..... B29C 35/045; B29C 35/0277; F26B 3/06; F26B 17/08; F26B 15/12; F26B 21/001; F26B 21/004; F26B 25/003; F26B 25/02
USPC ......... 34/236, 203, 647, 657, 171, 178, 199; 198/809, 860.1
See application file for complete search history.

(56) References Cited

U.S. PATENT DOCUMENTS

| | | | |
|---|---|---|---|
| 10,137,432 | B2 * | 11/2018 | Grünewald ............ B01J 20/261 |
| 2003/0105181 | A1 | 6/2003 | Stewart et al. |
| 2004/0200698 | A1 | 10/2004 | Weiser et al. |
| 2013/0058837 | A1 | 3/2013 | Weismantel et al. |
| 2014/0065194 | A1 | 3/2014 | Yoo et al. |
| 2014/0377538 | A1 | 12/2014 | Vorholt et al. |
| 2015/0183166 | A1 | 7/2015 | Yoo et al. |
| 2016/0193787 | A1 | 7/2016 | Yoo et al. |
| 2016/0207265 | A1 | 7/2016 | Yoo et al. |
| 2016/0279605 | A1 | 9/2016 | Grünewald et al. |
| 2017/0151723 | A1 | 6/2017 | Yoo et al. |
| 2018/0135912 | A1 | 5/2018 | Grunewald et al. |
| 2018/0162042 | A1 | 6/2018 | Yoo et al. |
| 2018/0264715 | A1 | 9/2018 | Yoo et al. |
| 2019/0226763 | A1 | 7/2019 | Bennett et al. |
| 2019/0275730 | A9 | 9/2019 | Yoo et al. |
| 2020/0001521 | A1 | 1/2020 | Yoo et al. |
| 2022/0126517 | A1 | 4/2022 | Yoo et al. |

FOREIGN PATENT DOCUMENTS

| | | |
|---|---|---|
| CN | 106696114 A | 5/2017 |
| CN | 109661550 A | 4/2019 |
| CN | 209813416 U | 12/2019 |
| CN | 210389767 U | 4/2020 |
| CN | 111306920 A | 6/2020 |
| CN | 210832951 U | 6/2020 |
| DE | 1170617 B | 5/1964 |
| EP | 2892708 A1 | 7/2015 |
| JP | H08073518 A | 3/1996 |
| JP | 2011518929 A | 6/2011 |
| JP | 2015-506400 A | 3/2015 |
| JP | 2017-504671 A | 2/2017 |
| JP | 2017207236 A | 11/2017 |
| KR | 100886248 B1 | 3/2009 |
| KR | 100906334 B1 | 7/2009 |
| KR | 101070220 B1 | 10/2011 |
| KR | 20180004788 A | 1/2018 |
| KR | 101835288 B1 | 3/2018 |
| KR | 20200024590 A | 3/2020 |

OTHER PUBLICATIONS

Odian, G. "Principle of Polymerization," Dec. 1981, p. 203, John Wiley & Sons.
Schwalm, R. "UV Coatings Basics, Recent Developments and New Application," Dec. 2006, p. 115, Elsevier Science.
Search Report dated Jan. 28, 2023 from the Office Action for Chinese Application No. 202180006170.9 issued Feb. 3, 2023, 3 pages. [See p. 1-2, categorizing the cited references].
Supplementary European Search Report including Written Opinion for Application No. 21881345.9 dated Oct. 13, 2022, pp. 1-10.

* cited by examiner

[FIG. 1]
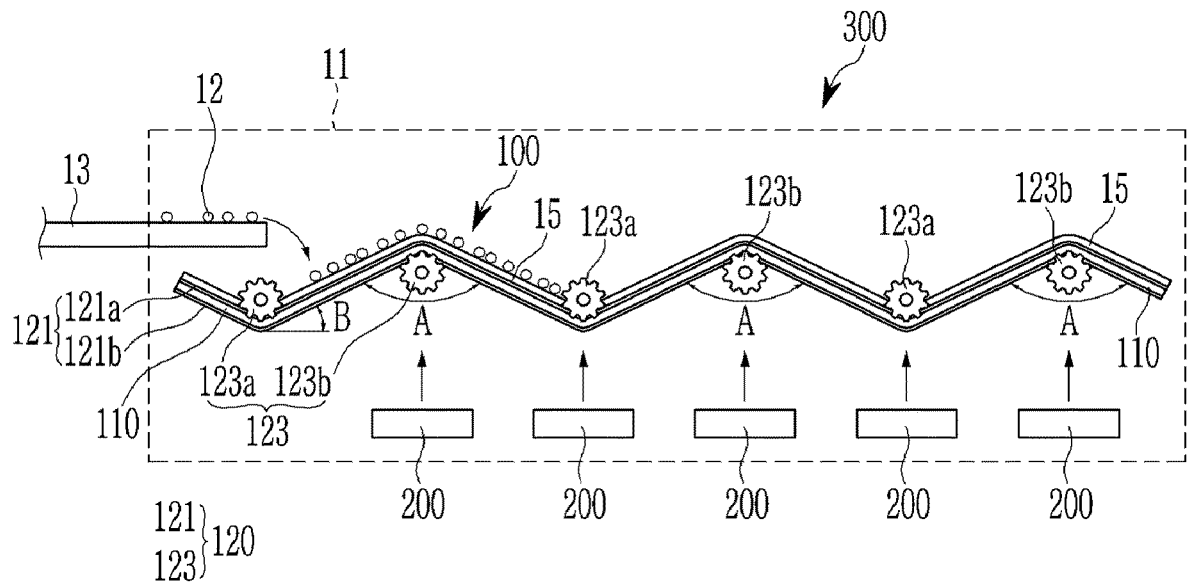
[FIG. 2]
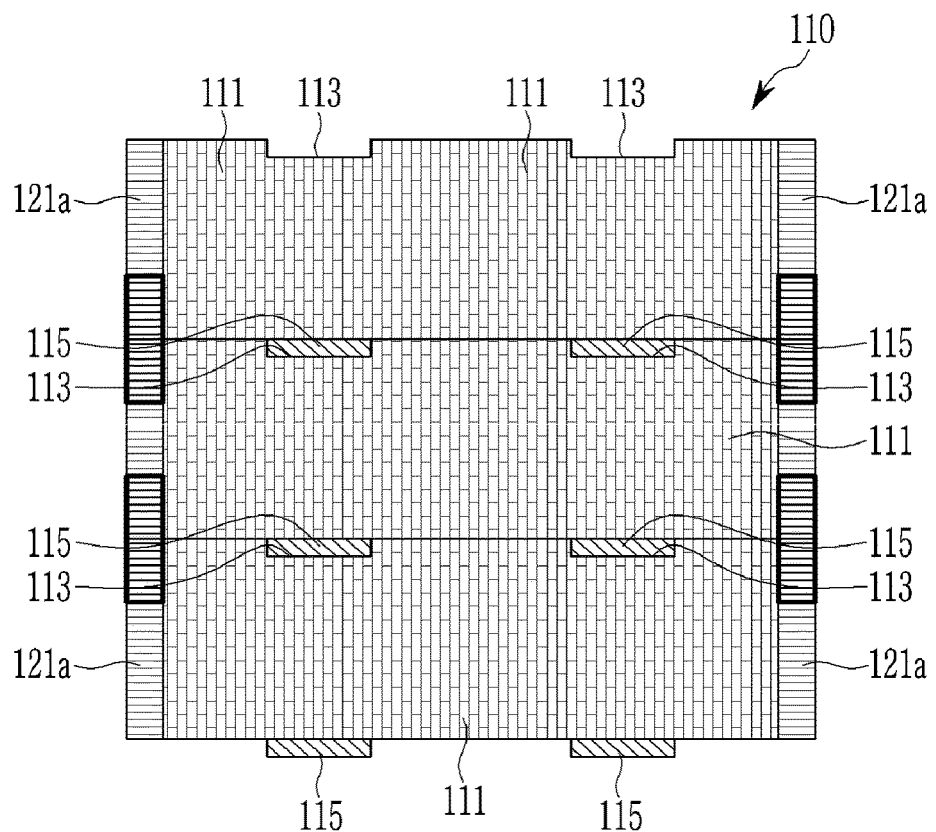

[FIG. 3]
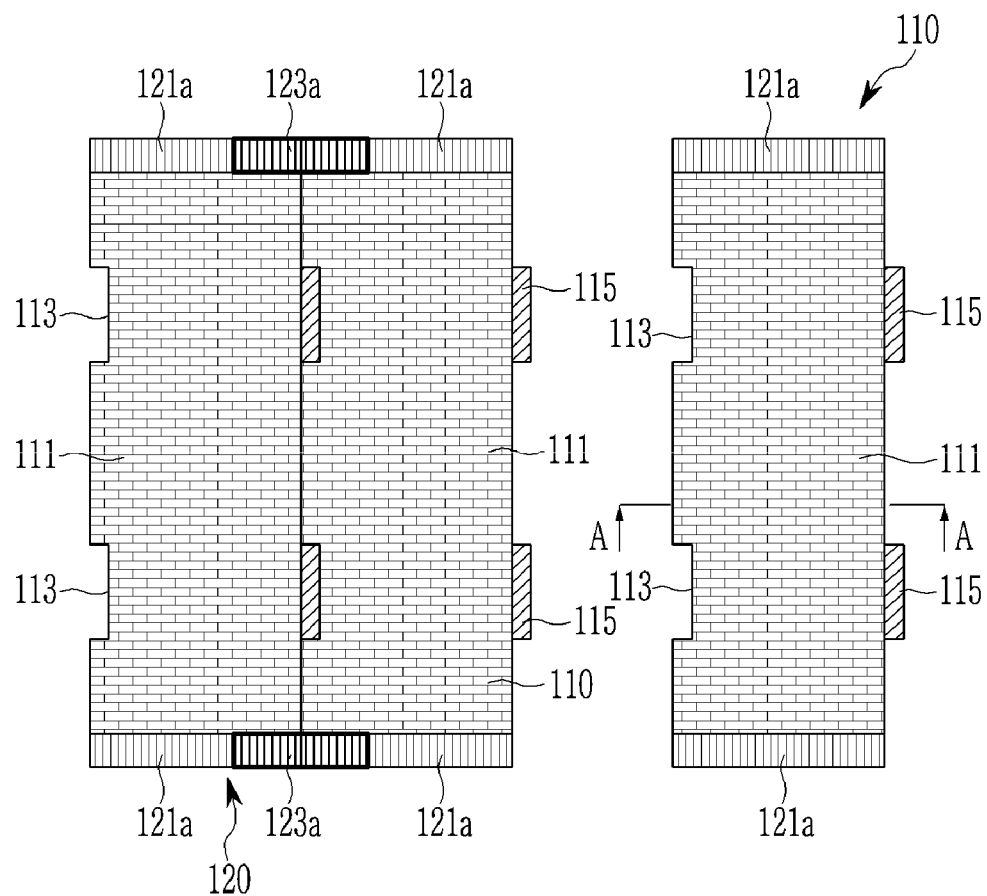
[FIG. 4]
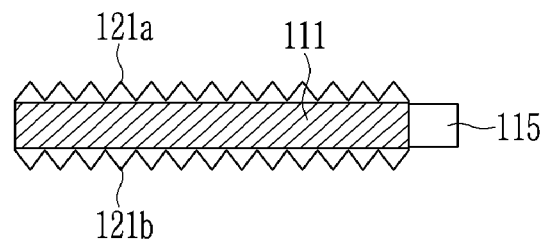

SUPER ABSORBENT POLYMER DRYING APPARATUS

CROSS-REFERENCE TO RELATED APPLICATION(S)

This application is a national phase entry under 35 U.S.C. § 371 of International Application No. PCT/KR2021/010292, filed Aug. 4, 2021, which claims priority to Korean Patent Application No. 10-2020-0138510 filed Oct. 23, 2020, the disclosures of which are incorporated herein by reference in their entirety.

TECHNICAL FIELD

The present application relates to a super absorbent polymer drying apparatus having improved drying efficiency of a super absorbent polymer.

BACKGROUND OF ART

Generally, a super absorbent polymer (SAP) is a polymer material in a white powder form produced by reacting acrylic acid with caustic soda, and is capable of absorbing moisture from about 500 to about 1000 times its own weight.

Super absorbent polymers are a type of synthetic polymeric materials that are deformed into a jelly-like form when they absorb water, and have a function capable of storing water without draining it even when pressure is applied to some degree from the outside.

Super absorbent polymer molecules have a network-like structure and can absorb water well due to many holes between them. Due to the difference of ion concentration between inside and outside a solution (water) of the super absorbent polymer, water moves inside the super absorbent polymer (osmotic pressure phenomenon). When water molecules flow into the super absorbent polymer, the space of the polymer chain is expanded while the anions fixed inside try to occupy a certain space by a repulsive force, which makes it possible to absorb more water (electrostatic repulsive force).

Such super absorbent polymers started to be practically applied in sanitary products, and now they are widely used for the preparation of hygiene products such as paper diapers for children or sanitary napkins, water retaining soil products for gardening, water stop materials for the civil engineering and construction, sheets for raising seedling, freshkeeping agents for food distribution fields, materials for poultices, or the like.

As the process for preparing such super absorbent polymers, a process by reverse phase suspension polymerization, a process by a solution polymerization, and the like have been known.

Among these, the process by aqueous solution polymerization includes a thermal polymerization method in which a polymerization gel is polymerized while being broken and cooled in a kneader equipped with shafts, a photo-polymerization method in which an aqueous solution with a high concentration is irradiated with UV rays onto a belt to perform polymerization and drying at the same time, and the like.

The method previously known in the art includes a method for producing an absorbent polymer in which a water-soluble ethylenically unsaturated monomer having a crosslinking agent is polymerized by irradiating ultraviolet rays in the presence of a radical-based photo-polymerization initiator having a benzoyl group and a peroxide, and the like.

An absorbent polymer produced through a polymerization reaction is produced into a powdery absorbent polymer through cutting, drying, pulverization, and surface treatment processes, and the like.

Among these, the drying process is performed in which the absorbent polymer is transferred to a dryer through a conveyor belt, and is laminated to a thickness of about 100 mm on a conveyor belt and dried into a sheet-shaped resin mass.

In the drying process, the super absorbent polymer before drying has a structure in which particles are easily separated in a state where the bonding force between the super absorbent polymers is not high, but the super absorbent polymer after drying has a hard structure in which particles are bonded to each other.

On the other hand, in a conventional conveyor belt, the drying operation of the super absorbent polymer is performed while being installed in a flat state, and thereby, there is a problem that the drying amount is limited in the drying process and the drying efficiency is limited.

DETAILED DESCRIPTION OF THE INVENTION

Technical Problem

It is an object of the present disclosure to provide a super absorbent polymer drying apparatus that can increase the contact area of hot air, increase the amount of drying, and improve drying efficiency by installing the conveyor in an inclined manner.

Technical Solution

One embodiment of the present disclosure provides a super absorbent polymer drying apparatus which is a drying apparatus equipped with a conveyor for drying the super absorbent polymer, the apparatus including a conveyor for transferring the super absorbent polymer, and a hot air supply part for supplying dry hot air to the conveyor.

The conveyor may include a plurality of conveyor beds connected to each other in a bent state, a link connecting part for connecting between the plurality of conveyor beds, and a driving part for driving the conveyor beds.

The conveyor beds may include a plurality of bed bodies to which the super absorbent polymer is seated on the surface and transferred, and a connection groove formed on a side surface of the bed body so that a link connecting part is connected.

The link connecting part may include a link protrusion that is protruded from one side of the bed body and is inserted into the connection groove of adjacent bed bodies.

The plurality of bed bodies may be inclinedly connected to each other in an angle range of 90 to 170 degrees.

The driving part may include a rack gear installed along an edge of the bed body, and a pinion gear meshed with the rack gear to provide a moving driving force to the bed body.

The rack gear may include a first rack gear installed along an upper side surface edge of the bed body, and a second rack gear installed along a lower side surface edge of the bed body.

The pinion gear may include a first pinion gear that transfers a rotational driving force to the first rack gear from an upper side of the bed body, and a second pinion gear that transfers a rotational driving force to the second rack gear from a lower side of the bed body.

The first pinion gear may be meshed with the first rack gear at an upper side of a position where the plurality of bed bodies are inclinedly connected to each other.

The second pinion gear may be meshed with the second rack gear at a lower side of a position where the plurality of bed bodies are inclinedly connected to each other.

Advantageous Effects

According to one embodiment of the present disclosure, a plurality of bed bodies constituting the conveyor are inclinedly connected to each other and are operated by the driving force of the driving part, thus increasing the contact area of the hot air supplied to the conveyor, allowing the thickness of a crumb bed to be reduced, and improving drying efficiency.

BRIEF DESCRIPTION OF THE DRAWINGS

FIG. 1 is a schematic view showing a main part of a super absorbent polymer drying apparatus according to one embodiment of the present disclosure.

FIG. 2 is a plan view of a main part showing a state in which a plurality of bed bodies of the conveyor bed of FIG. 1 are connected.

FIG. 3 is a plan view of a main part schematically showing a state in which a part of the bed body of FIG. 2 is separated, and FIG. 4 is a cross-sectional view schematically showing the bed body as viewed along the line A-A of FIG. 3.

<Description of Reference Numerals>

| | |
|---|---|
| 11 dryer body | 12 super absorbent polymer |
| 13 input part | 100 conveyor |
| 110 conveyor bed | 111 bed body |
| 113 connection groove | 115 link connecting part, link protrusion |
| 120 driving part | 121 rack gear |
| 121a first rack gear | 121b second rack gear |
| 123 pinion gear | 123a first pinion gear |
| 123b second pinion gear | 200 hot air supply part |

DETAILED DESCRIPTION OF THE EMBODIMENTS

Hereinafter, embodiments of the present disclosure will be described in detail with reference to the accompanying drawings so that those skilled in the art can easily implement them. The embodiments of the present disclosure can be modified in various different ways, and are not limited to the embodiments set forth herein. In the drawings, portions that are irrelevant to the description will be omitted to clearly describe the present disclosure, and like reference numerals designate like elements throughout the specification.

FIG. 1 is a schematic view showing a main part of a super absorbent polymer drying apparatus according to one embodiment of the present disclosure. FIG. 2 is a plan view of a main part schematically showing a state in which a plurality of bed bodies of the conveyor bed of FIG. 1 are connected. FIG. 3 is a plan view of a main part schematically showing a state in which a part of the bed body of FIG. 2 is separated. FIG. 4 is a cross-sectional view schematically showing the bed body as viewed along the line A-A of FIG. 3.

As shown in FIGS. 1 to 4, the super absorbent polymer drying apparatus 300 according to one embodiment of the present disclosure is a drying apparatus equipped with a conveyor for drying the super absorbent polymer, and may include a conveyor 100 for transferring the super absorbent polymer 12 and a hot air supply part 200 for supplying dry hot air to the conveyor 100.

The conveyor 100 may be installed so as to receive the supply of the super absorbent polymer 12 and transfer the super absorbent polymer 12 to the inside of the dryer body 11.

An input part 13 for supplying the super absorbent polymer 12 to the conveyor 100 may be installed on the side surface of the dryer body 11.

The input part 13 is installed so as to properly input the super absorbent polymer 12 to be dried in the direction of the conveyor 100 from the side surface of the dryer body 11, and may be installed so that the super absorbent polymer 12 is inputted by being dropped by its own weight on the conveyor 100 installed inside the dryer body 11.

The conveyor 100 is installed so as to be movable in one direction or a reverse direction by the driving operation of the driving part 120 in the inside of the dryer body 11, and can be installed so that the drying operation of the super absorbent polymer 12 is performed by the hot air supplied through the hot air supply part 200.

The hot air supply part 200 is installed in plural numbers at the lower part of the conveyor 100, so as to supply dry hot air for drying to the conveyor 100.

More specifically, the conveyor 100 includes a plurality of conveyor beds 110 connected to each other in a bent state, a link connecting part 115 for connecting between the plurality of conveyor beds 110, and a driving part 120 for driving the conveyor beds 110.

A plurality of conveyor beds 110 can be installed so as to be connected to each other in a state of being adjacent to each other. The conveyor beds 110 can be movably installed by the driving force of the driving part 120 at the inside of the dryer body 11 in a state in which they are inclinedly connected to each other.

The conveyor bed 110 may include a plurality of bed bodies 111 in which the super absorbent polymer 12 is seated on the surface and transferred, and a connection groove 113 formed on the side surface of the bed body 111 to connect the link connecting part 115.

The bed bodies 111 may have a rectangular planar shape, and a plurality of them may be connected to each other by a link connecting part 115 in a state of being adjacent to each other.

A connecting groove 113 to which a link connecting part 115 is connected can be formed on one side of the bed body 111 so that a plurality of the bed bodies 111 are connected to each other in a state of being adjacent to each other.

The connection groove 113 is formed in plural numbers on one side of the bed body 111, and can be formed so that a link connecting part 115 formed on a side surface of any of the adjacent bed bodies 111 is connected to the bed body 111 of a plurality of bed bodies.

These connection grooves 113 are formed in two pieces spaced apart from each other on one side of the bed body 111, and may be connected in a state in which the link connecting part 115 is inserted therein.

The link connecting part 115 is formed to protrude from the side surface opposite to the side surface of the bed body 111 on which the connection groove 113 is formed, and in this embodiment, it can be applied as a link protrusion that is connected in a state of being inserted into the connection groove 113. Hereinafter, the same reference numerals are used for the link connecting part and the link protrusion part.

The link protrusion 115 is protruded in a state of being separated from each other on the side of the bed body 111, and may be inserted and fixed in the connection grooves 113 formed in the adjacent bed bodies 111 in a state in which the plurality of bed bodies 111 are disposed adjacent to each other.

Here, the plurality of bed bodies 111 may be inclinedly connected to each other in an angle range A of 90 degrees to 170 degrees.

The plurality of bed bodies 111 may be installed to be inclined in an angle range B of 5 degrees to 45 degrees in the upward direction in the dryer body 11. Further, the plurality of bed bodies 111 may be inclinedly connected to each other in an angle range of 90 degrees to 170 degrees.

The plurality of bed bodies 111 may be connected to each other in a zigzag shape in the upper and lower directions when the state of being connected to each other is viewed from the side.

As described above, in the conveyor 100 of this embodiment, a plurality of bed bodies 111 are inclinedly connected to each other, and in the internal space of the dryer body 11, the surface area on which the super absorbent polymer is seated can be increased by 12% or more compared to a conventional flat conveyor.

That is, when the plurality of bed bodies 111 of this embodiment are inclinedly connected at an angle range of 90 degrees to 170 degrees to each other compared to the conventional 1 m flat conveyor, it is possible to extend the connected length to 1.12 m. Therefore, the thickness of the crumb bed installed on the upper surface of the bed body 111 can be reduced by 12% and the area to which the hot air is contacted can be increased by 12%, and thus, the drying efficiency of the super absorbent polymer can be improved.

Meanwhile, the driving part 120 may be movably installed inside the dryer body 11 in a state in which the plurality of bed bodies 111 are connected to each other by the link protrusions 115.

More specifically, the driving part 120 may include a rack gear 121 installed along the edge of the bed body 111, and a pinion gear 123 meshed with the rack gear 121 to provide a moving driving force to the bed body 111.

The rack gear may include a first rack gear 121a installed along an upper side surface edge of the bed body 111, and a second rack gear 121b installed along a lower side surface edge of the bed body 111.

The first rack gear 121a can be installed at the positions of both side ends facing each other from the upper side surface of the plurality of bed bodies 111.

The first rack gear 121b can be installed at the positions of both side ends facing each other from the lower side surface of the plurality of bed bodies 111.

The pinion gear 123 can be meshed with the first rack gear 121a and the second rack gear 121b.

The pinion gear 123 may include a first pinion gear 123a that transfers a rotational driving force to the first rack gear 121a from an upper side of the bed body 111, and a second pinion gear 123b that transfers a rotational driving force to the second rack gear 121b from the lower side of the bed body 111.

The first pinion gear 123a may be installed such that the plurality of bed bodies 111 are meshed with the first rack gear 121a from the upper side connected to each other.

The first pinion gear 123a can be installed in a state in which the plurality of bed bodies 111 are meshed with the first rack gear 121a from a position where they are connected to each other. Therefore, the first pinion gear 123a may transfer a driving force to the conveyor 100 while supporting the upper side where the plurality of bed bodies 111 are connected to each other.

The first pinion gear 123a is installed in a plurality so as to support the upper side position in which the plurality of bed bodies 111 are connected to each other, and can be installed so as to support an upper side position in which the plurality of bed bodies 111 are connected in an inclined manner.

The second pinion gear 123b may be installed so as to mesh with the second rack gear 121b from a lower side in which the plurality of bed bodies 111 are connected to each other.

The second pinion gear 123b may be installed in a state where the plurality of bed bodies 111 are meshed with the second rack gear 121b at positions connected to each other. Therefore, the second pinion gear 123b may transfer a driving force to the conveyor 100 while supporting the lower side where the plurality of bed bodies 111 are connected to each other.

The second pinion gear 123b is installed in a plurality so as to support the lower position in which the plurality of bed bodies 111 are connected to each other, and can be installed so as to support the lower side position where the plurality of bed bodies 111 are connected in an inclined manner.

The first pinion gear 123a and the second pinion gear 123b as described above are respectively installed at mutually alternating positions so as to support the upper and lower sides of the bed body 111 at the position where the plurality of bed bodies 111 are connected.

In this way, the first pinion gear 123a and the second pinion gear 123b can be installed so as to properly transfer a driving force to the conveyor 100 while stably supporting the state in which the plurality of bed bodies 111 are inclinedly connected.

As described above, in the super absorbent polymer drying apparatus 300 of the embodiments of the present disclosure, a plurality of bed bodies 111 constituting the conveyor 100 are inclinedly connected to each other and are operated by the driving force of the driving part 120, thereby increasing the contact area of the hot air supplied to the conveyor 100, allowing the thickness of the crumb bed to be reduced, and improving the drying efficiency of the super absorbent polymer.

The super absorbent polymer referred to in the present disclosure can be produced by a conventional method and is not particularly limited. For example, the super absorbent polymer can be polymerized by subjecting a monomer composition solution containing a raw material of the super absorbent polymer to thermal polymerization or photopolymerization.

The raw material of the super absorbent polymer may include a monomer, a basic compound for neutralizing the monomer, a polymerization initiator, a crosslinking agent, and various additives.

The monomer can be used without limitation in the constitution, as long as it is a monomer commonly used in the preparation of the super absorbent polymer. As the monomer, any one or more selected from the group consisting of an anionic monomer and salts thereof, a nonionic hydrophilic monomer, and an amino group-containing unsaturated monomer and a quaternary ammonium compound thereof can be used.

Specifically, any one or more selected from the group consisting of: an anionic monomer such as (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, or polyethylene glycol (meth)acrylate; and an amino group-containing unsaturated monomer such as (N,N)-dimethylaminoethyl (meth)acrylate or (N,N)-dimethylaminopropyl(meth)acrylamide, and a quaternary ammonium compound thereof can be preferably used.

The concentration of the monomer may be appropriately selected and used in consideration of the polymerization time, reaction conditions, and the like.

The monomer composition solution contains a polymerization initiator, and when ultraviolet rays are irradiated from the polymerization energy supply part, a photo-polymerization initiator may be included, and when hot air is supplied, a thermal polymerization initiator and the like may be included.

As the thermal polymerization initiator, any one or more selected from the group consisting of a persulfate-based initiator, an azo-based initiator, a peroxide-based initiator, hydrogen peroxide, and ascorbic acid can be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like, and examples of the azo-based initiator include 2,2-azobis(2-amidinopropane)dihydrochloride), 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like. More various thermal polymerization initiators are well disclosed in "Principle of Polymerization (Wiley, 1981 sus)" written by Odian, p. 203, however, they are not limited to the above-mentioned examples.

As the photo-polymerization initiator, any one or more compounds selected from the group consisting of benzoin ether, dialkyl acetophenone, hydroxyl alkyl ketone, phenyl glyoxylate, benzyl dimethyl ketal, acyl phosphine, and α-aminoketone may be used. Meanwhile, specific examples of acyl phosphine may include commercially available Lucirin TPO, namely, 2,4,6-trimethyl-benzoyl-trimethyl phosphine oxide. More various photo-polymerization initiators are well disclosed in "UV Coatings: Basics, Recent Developments and New Applications (Elsevier, 2007)" written by Reinhold Schwalm, p. 115, however, they are not limited to the above-mentioned examples.

As the crosslinking agent, one kind or a combination of two or more kinds selected from diacrylate-based crosslinking agent including hexanediol diacrylate, ethylene glycol diacrylate, diethylene glycol diacrylate, triethylene glycol diacrylate, propylene glycol diacrylate, dipropylene glycol diacrylate, tripropylene glycol diacrylate, a triacrylate-based crosslinking agent, an aziridine-based crosslinking agent, an epoxy-based crosslinking agent, and the like.

The crosslinking agent may be contained in an amount of about 0.01 to about 0.5% by weight based on the total content of the monomer composition.

Additives may include a thickener, a plasticizer, a preservation stabilizer, an antioxidant, and the like.

The monomer, polymerization initiator, crosslinking agent, and additive can be prepared in the form of a solution dissolved in a solvent.

In this case, the solvent can be used without limitation in the constitution as long as it can dissolve the above-mentioned components. For example, one kind or a combination of two or more kinds selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, and the like can be used.

The solvent may be included in the residual quantity excluding the components disclosure above based on the total content of the monomer composition.

Specifically, the polymerization method is largely classified into the thermal polymerization and the photo-polymerization according to the polymerization energy source. Usually, the thermal polymerization may be carried out in a reactor like a kneader equipped with agitating spindles and the photo-polymerization may be carried out in a reactor equipped with a movable conveyor belt or in a container with a flat bottom, however, the polymerization method disclosed above is only one example, and the present disclosure is not limited to the polymerization method disclosed above.

In one example, the hydrogel polymer obtained by subjecting to the thermal polymerization in the reactor like a kneader equipped with the agitating spindles as disclosed above by providing hot air thereto or heating the reactor may have the size of centimeters or millimeters when it is discharged from the outlet of the reactor, according to the types of the agitating spindles equipped in the reactor. Specifically, the size of the obtained hydrogel polymer can be variously shown according to the concentration of the monomer composition fed thereto, the feeding speed, and the like, and the hydrogel polymer of which the weight average particle size is 2 to 50 mm can be generally obtained.

Further, as described above, when the photo-polymerization is carried out in a reactor equipped with a movable conveyor belt or in a container with a flat bottom, the hydrogel polymer typically obtained may be a hydrogel polymer in a sheet-type having a width of the belt. In this case, the thickness of the polymer sheet may vary according to the concentration of the monomer composition fed thereto and the feeding speed, and the polymer sheet is preferably controlled to have a thickness of about 0.5 to about 5 cm. If the monomer composition is fed so that the thickness of the sheet-type polymer becomes too thin, the production efficiency becomes low, which is not preferred. If the thickness of the sheet-type polymer exceeds 5 cm, the polymerization reaction may not uniformly occur throughout the thickness of the polymer due to the excessively high thickness.

In this case, the hydrogel polymer obtained by the above-described method may have typically a water content of about 40 to about 80% by weight. Meanwhile, the term "water content" as used herein means a weight occupied by moisture with respect to a total amount of the hydrogel polymer, which may be the value obtained by subtracting the weight of the dried polymer from the weight of the hydrogel polymer. Specifically, the water content is defined as a value calculated by measuring the weight loss according to evaporation of water in the polymer during the drying process of increasing the temperature of the polymer with infrared heating. At this time, the water content is measured under the drying conditions which are determined as follows: the temperature is increased from room temperature to about 180° C. and then the temperature is maintained at 180° C., and the total drying time is determined as 40 minutes, including 5 minutes for the temperature rising step.

Subsequently, when drying the obtained hydrogel polymer, the super absorbent polymer drying apparatus of the present disclosure can be used.

Although the preferred embodiment of the present disclosure has been described above, it is to be understood that the present disclosure is not limited to the disclosed embodiments, but on the contrary, various modifications can be made within the scope of the claims, the detailed description, and the accompanying drawings, which also falls within the sprit and scope of the present disclosure.

The invention claimed is:

1. A super absorbent polymer drying apparatus, the apparatus comprising:
a conveyor for transferring the super absorbent polymer; and
a hot air blower configured to supply dry hot air to the conveyor,
wherein the conveyor comprises:
a plurality of conveyor beds connected to each other in a bent state;
a plurality of links to connect the plurality of conveyor beds each having a bed body to comprise a plurality of bed bodies, and the link having a link protrusion that is protruded from one side of each of the bed body and is inserted into a connection groove of each adjacent bed body, wherein the connection groove is formed on a side surface of each of the bed body so that the link is connected;
a driving part having a rack gear, a pinion gear to drive the plurality of conveyor beds;
wherein the plurality of bed bodies having a surface for the super absorbent polymer to be seated and transferred; and
wherein, the plurality of bed bodies are inclinedly connected to each other in an angle range of 90 to 170 degrees.

2. The super absorbent polymer drying apparatus of claim 1, wherein
the driving part further comprises:
the rack gear installed along an edge of each of the bed body; and
the pinion gear meshed with the rack gear to provide a moving driving force to each of the bed body.

3. The super absorbent polymer drying apparatus of claim 2, wherein
the rack gear comprises:
a first rack gear installed along an upper side surface edge of each of the bed body; and
a second rack gear installed along a lower side surface edge of each of the bed body.

4. The super absorbent polymer drying apparatus of claim 3, wherein
the pinion gear comprises:
a first pinion gear that transfers a rotational driving force to the first rack gear from an upper side of each of the bed body; and
a second pinion gear that transfers a rotational driving force to the second rack gear from a lower side of each of the bed body.

5. The super absorbent polymer drying apparatus of claim 4, wherein
the first pinion gear is meshed with the first rack gear at an upper side of a position where the plurality of bed bodies are inclinedly connected to each other.

6. The super absorbent polymer drying apparatus of claim 5, wherein
the second pinion gear is meshed with the second rack gear at an upper side of a position where the plurality of bed bodies are inclinedly connected to each other.

* * * * *